Feb. 24, 1925.
P. OLSON
TIRE CHAIN FASTENER
Filed Sept. 24, 1923
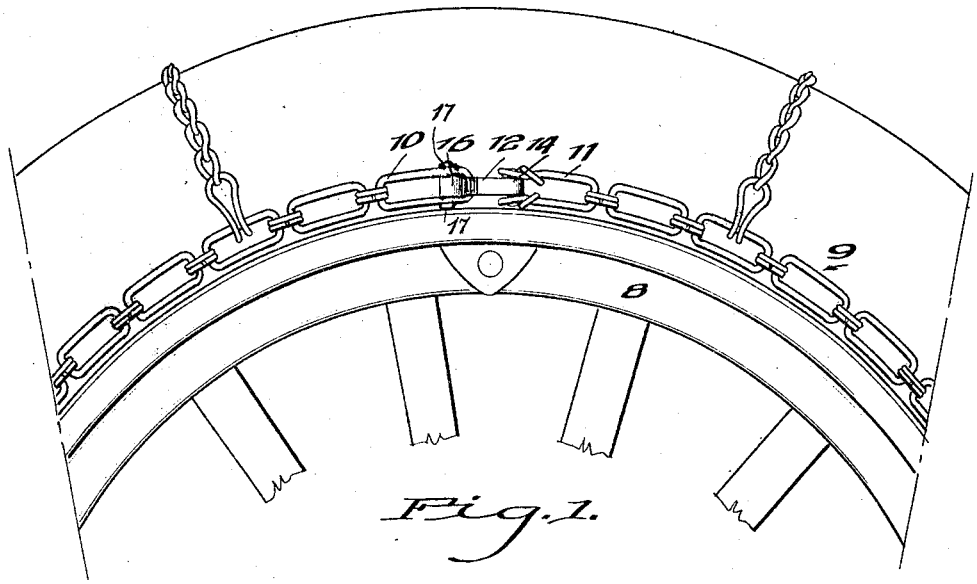
Fig.1.
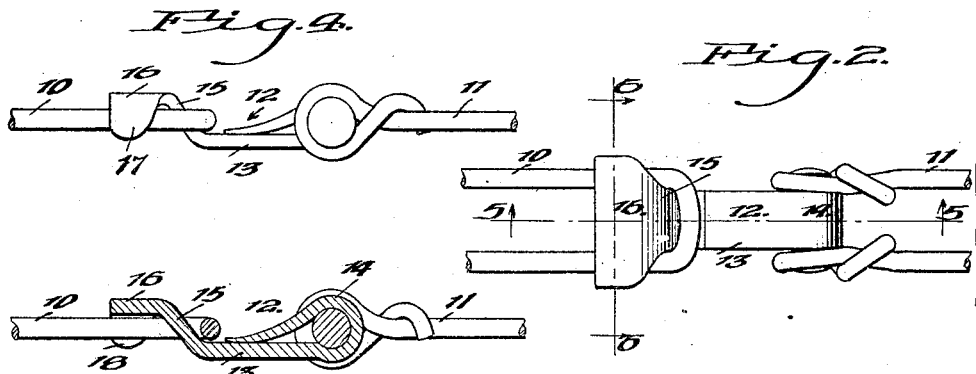
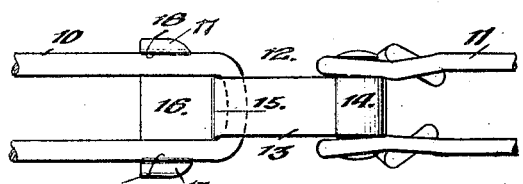
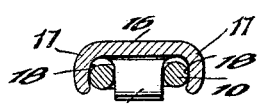
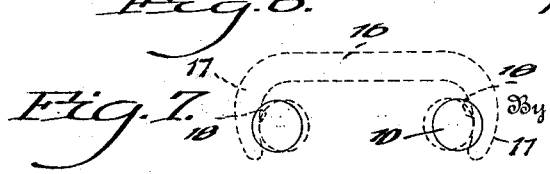
Inventor
Peter Olson
Attorney Patented Feb. 24, 1925.

1,527,325

UNITED STATES PATENT OFFICE.

PETER OLSON, OF BRECKENRIDGE, TEXAS.

TIRE-CHAIN FASTENER.

Application filed September 24, 1923. Serial No. 664,493.

*To all whom it may concern:*

Be it known that I, PETER OLSON, a citizen of the United States, residing at Breckenridge, in the county of Stephens and State of Texas, have invented certain new and useful Improvements in Tire-Chain Fasteners, of which the following is a specification.

The present invention relates to improvements in securing means for anti-skid chains for automobiles, and the like, and the object thereof is to provide a detachable fastener for the purpose indicated which positively connects the two ends of the chain irrespective of the direction of the strain.

A further object is to provide a device of the character described, which is simple in structure, being formed of a single piece, and hence inexpensive to manufacture.

In the drawings:—

Figure 1 is a fragmentary view in elevation of an automobile wheel carrying anti-skid chains provided with the fastener.

Figure 2 is a plan view of the rear side of the fastener and associated elements.

Figure 3 is a plan view of the front side of the fastener and associated elements.

Figure 4 is a side elevation of the fastener and associated elements,

Figure 5 is a section taken on line 5—5 of Figure 2,

Figure 6 is a section taken on line 6—6 of Figure 2,

Figure 7 is an enlarged view similar to Figure 6, but diagrammatic in character.

Referring to the drawings, 8 indicates an automobile wheel carrying an anti-skid chain 9, the two end links thereof being designated 10 and 11. The present invention, indicated generally by the numeral 12, comprises a tongue 13 provided at one end with an eye 14 for pivotal connection with the link 11. At its other end the tongue 14 is offset, as indicated at 15, and is provided with a T-head 16 having each end 17 thereof bent rearwardly, with the free terminals turned slightly inwardly, as shown more clearly in Figures 6 and 7, to provide interior cam faces 18.

The T-head 16 is adapted to be passed through the link 10, one end of the link being in rear of the offset portion 15 of tongue 14 and the sides of the link being engaged between and within the rearwardly turned ends 17 and pressed slightly inwardly thereby, as clearly indicated in Figure 7. The ends 17 and the sides of link 10 are relatively yielding, thus it is evident that the link is held securely in the T-head and will not jar loose or permit the T-head to twist and slip from normal fastened position. To uncouple the chain it is necessary to press on the end of tongue 14 opposite the T-head until the cam surfaces 18 are disengaged from the sides of link 10. The T-head may then be turned laterally and removed from the link 10.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

1. The combination with a chain having free ends to be connected, of a connector comprising a tongue pivoted at one end to one end of the chain, the other end of said chain having a terminal link, said tongue being provided with a cross head at its other end and said cross head having a transverse length greater than the width of the space within the link, said tongue passing through said link and the cross head and bearing against the sides of said link and having terminal lugs that embrace the outer sides thereof.

2. A fastener for anti-skid tire chains comprising a link, and a tongue that has an offset portion that has a draft bearing against the free end of the link and is provided with a cross head of greater transverse length than the space in the link, said head having offset link-embracing lugs at its ends, and said lugs being spaced apart a distance slightly less than the width of the portion of the link that is embraced by them.

3. A fastener for anti-skid tire chains, comprising a link, and a tongue having a cross head at one end integral therewith and located in a longitudinal plane different from the main portion of the link, the portion of the tongue adjacent the cross head having a draft bearing against the free end of the link and said cross head being adapted to pass through the link and having terminal offset hooked ends that embrace the outer sides of the link.

In testimony whereof, I affix my signature.

PETER OLSON.